4 Sheets--Sheet 1.

F. MYERS.

Machines for Bundling Kindling-Wood.

No. 5,893.

Reissued May 26, 1874.

Witnesses
W. H. Van Rensselaer
R. A. Van Rensselaer

Inventor:
Frederick Myers

HARRIS PETERS INC. LITHO. WASHINGTON D.C.

4 Sheets--Sheet 2.

F. MYERS.

Machines for Bundling Kindling-Wood.

No. 5,893. Reissued May 26, 1874.

Witnesses.
W. H. Van Rensselaer
R. A. Van Rensselaer

Inventor:
Frederick Myers

4 Sheets--Sheet 3.

F. MYERS.

Machines for Bundling Kindling-Wood.

No. 5,893. Reissued May 26, 1874.

Witnesses.

W. H. Van Rensselaer

R. A. Van Rensselaer

Inventor:

Frederick Myers

4 Sheets--Sheet 4.

F. MYERS.

Machines for Bundling Kindling-Wood.

No. 5,893

Reissued May 26, 1874.

*Witnesses.*

W. H. Van Rensselaer

R. A. Van Rensselaer

*Inventor.*

Frederick Myers

UNITED STATES PATENT OFFICE.

FREDERICK MYERS, OF NEW YORK, N. Y.

IMPROVEMENT IN MACHINES FOR BUNDLING KINDLING-WOOD.

Specification forming part of Letters Patent No. 74,407, dated February 11, 1868; reissue No. 5,893, dated May 26, 1874; application filed February 4, 1874.

*To all whom it may concern:*

Figure 7:
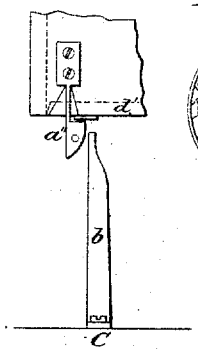
Figure 6:
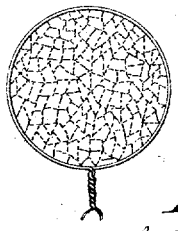
Figure 8:
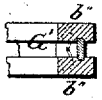
Figure 2:
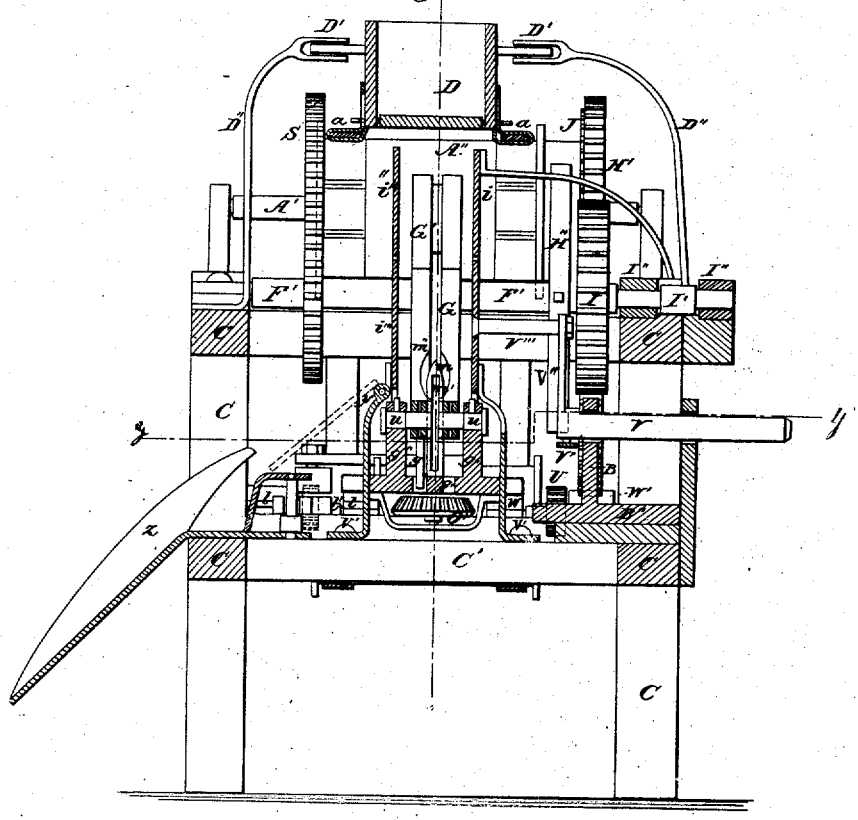
Figure 4:
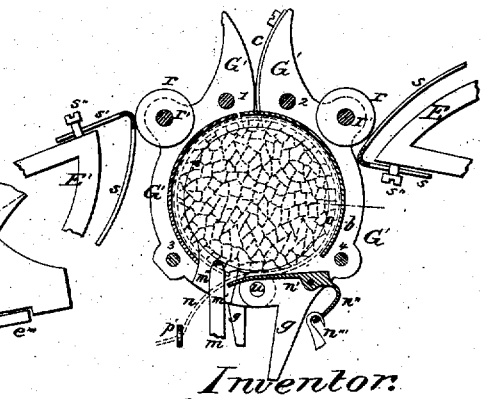
Figure 5:
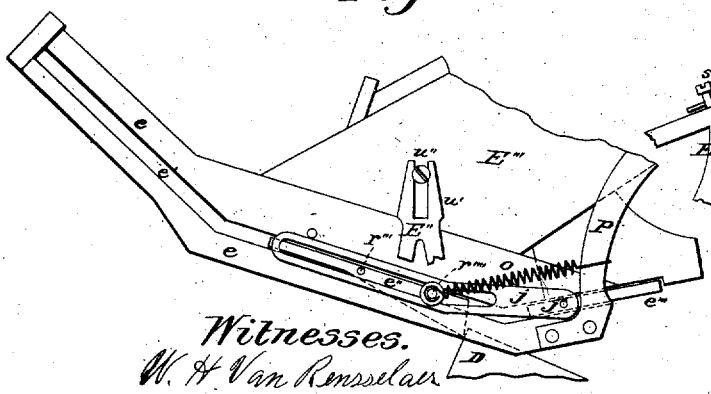
Figure 3:
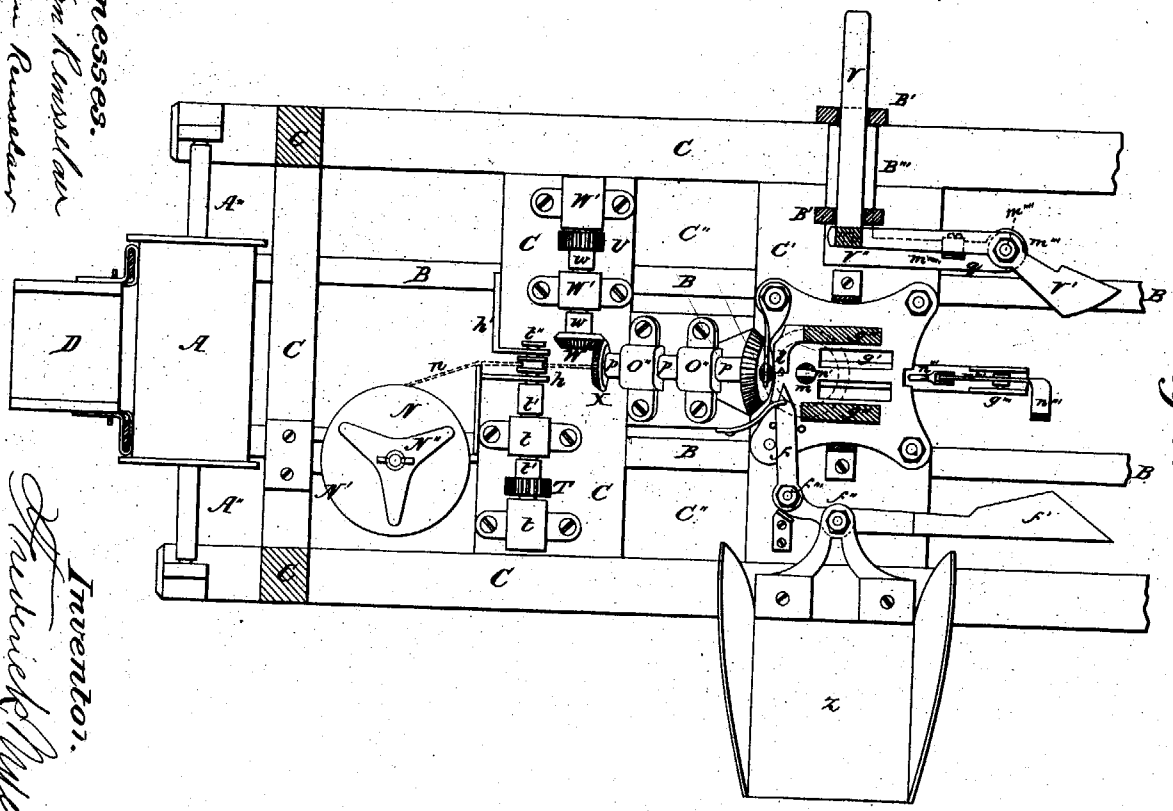

Be it known that I, FREDERICK MYERS, of the city, county, and State of New York, have invented a Machine for Bundling Kindling-Wood, of which the following is a specification:

Figure $1^a$ $1^b$ is a transverse vertical section through middle of the machine. Fig. 2 is a cross-section of the same through the line $x\,x$, Fig. $1^a$. Fig. 3 is a plan view of the parts below the line $y\,y'$, Fig. 2. Fig. 4 is a detail section of the clamps. Fig. 5 is a detail side elevation of the chute. Fig. 6 is a bundle of the fagots bound with wire. Fig. 7 is a detail view of catch in the bottom of the boxes. Fig. 8 is a detail view of a portion of one of the clamps, exhibiting the points for confining the wire.

Similar letters of reference indicate corresponding parts.

This invention relates to an improved machine for bundling and tying fagots of kindling-wood in a form ready for sale; and it consists in an endless belt or carrier, provided with fagot-receptacles, which receive and gage the fagots and carry them to compressing-jaws, which are provided with a guideway or groove to permit the passage of the wire about the bundle of wood held in the clamp. The wire is fed from a reel or spool by means of feeding-rollers, passes through a twisting-spindle, and, when passed about the bundle and cut off by a cutter, it is twisted by such spindle; and when the bundle is completed, it is removed from the bundle-forming devices into a chute by a plunger.

A″ A A A A are rollers, revolving on shaft A′ in the frame C, and carrying a suitable endless belt, B, provided with fagot-carrying boxes, or fagot receptacles or frames D. A chute, E‴, is fixed above the frame on standards provided with guides $e$, having slots $e'$, in which slide movable bottoms $e''$ $e'''$. The boxes D pass under this chute, and the forward end of the passing box strikes against the bottom $e''$, and pushes it along on its guides, thus removing the said bottom from under the chute E‴, and letting down a quantity of fagots into the box. As the filled box passes on, the bottom $e'''$ is made to follow closely after, and in contact with the rear end of the box, so that the throat of the chute is left open but an instant. Motion is imparted to the bottom $e'''$ by means of a slotted plate, $j$, pivoted to $e'''$, at $j'$, Fig. 5, and in the slot of said plate the pin $r''''$ of the bottom $e''$ travels the entire length of the slot, thus allowing the bottom $e''$ to move the required distance before it draws the bottom $e'''$ after it. Suitable springs $o$ are attached to the pins $r''''$ on the bottom $e''$, and to some fixed point, as the plate P. This spring brings back the bottom $e''$ to its normal position under the throat of the chute after it has become disengaged from the forward end of the box D. The said bottoms travel in their slides by means of pins $r'''$ $r''''$, two in number on each side of each bottom, whereby the latter can pass the angles in the sides. When the bottom $e''$ passes from underneath the chute, and enters the inclined part of the slide, it is borne upward from the box, and the edge of the bottom $e''$ is at length disengaged from the box by rising above the latter, and, obeying the tension of the spring $o$, flies back to its first position, which closes the lower throat of the chute. In so doing it strikes forcibly against the bottom $e'''$, which was drawn forward by the said slotted plate $j$, to close the chute immediately after the filled box passed forward and forces it back, and both bottoms are then in their original position. The chute is inclined so that the fagots may slide down regularly, and fall parallel to each other into boxes, and the inclination serves at the same time to prevent the fagots from pressing too heavily upon the bottoms, thus hindering their action. This chute is designed to take the fagots from a splitting-machine.

Figure 1A:
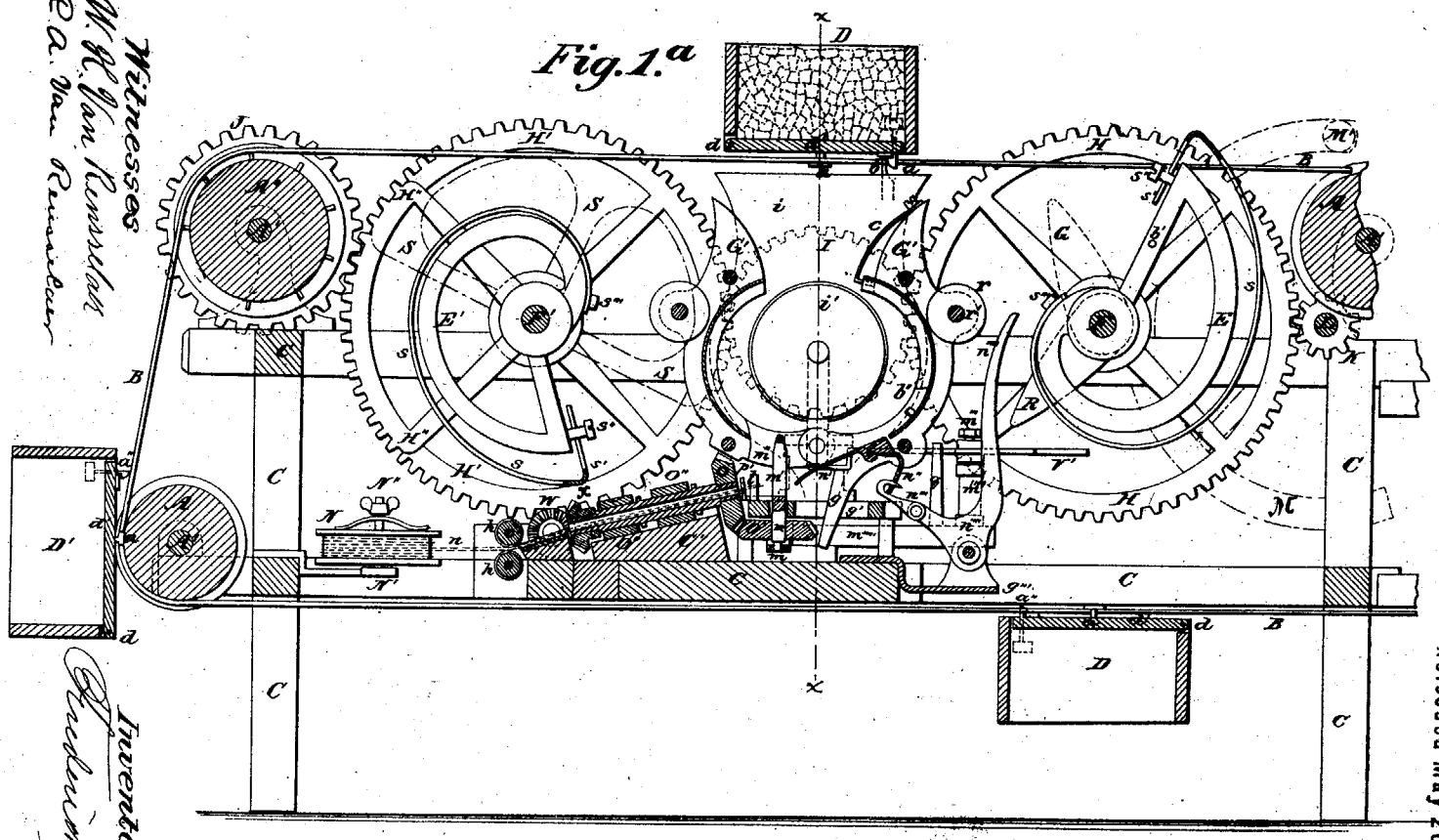
Figure 1:
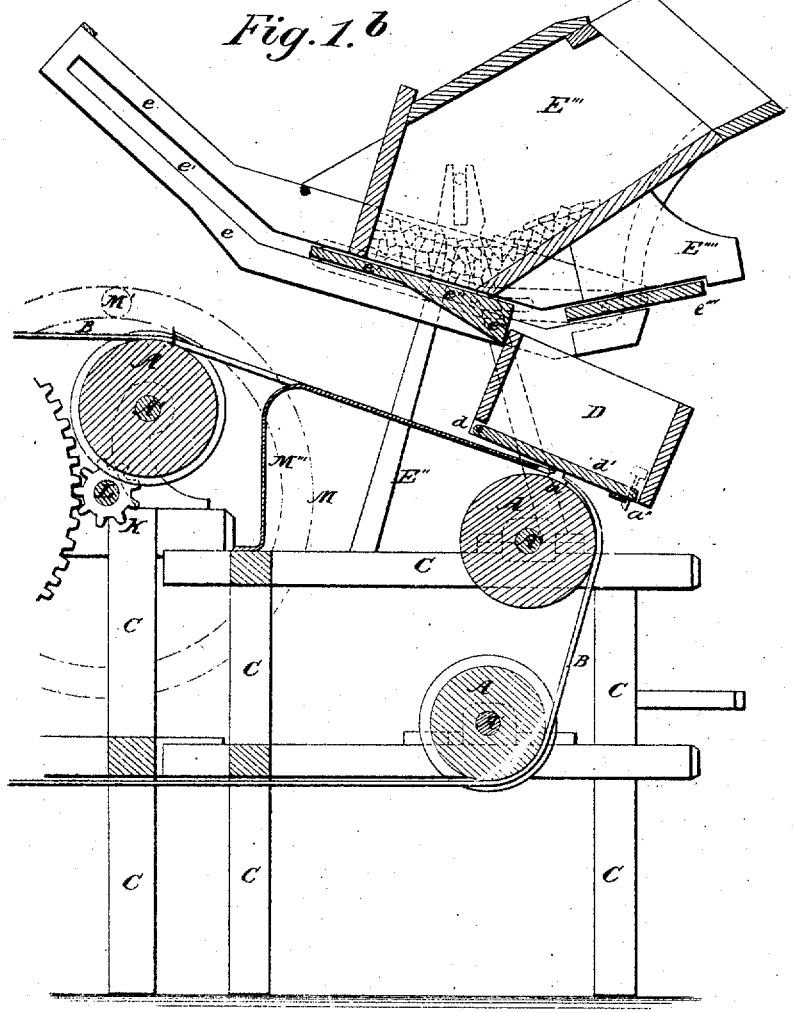

The wood holding and compressing clamps G′ G′ are held together by a pivot, $u$, passing through the plate $g^2$, as shown at Fig. 2. The clamps may be steadied in their movements by projections $g$ working in slots $g^1$ in a bottom plate, and friction-rollers $r$ $r$ work on pivots on the exterior of the clamps. Cams E E′ are keyed on shafts F F′, having toothed wheels H H′. The wheel H receives its motion from a pinion, K, keyed on a shaft, L, provided with a crank-wheel, M, for a pulley, for the application of steam or other power. I is an idle-wheel on the end of a shaft, I′, for transmitting the motion from H to H′, whereby the cam E′ and other parts are operated. The teeth of H′ engage with a toothed wheel, J, keyed on the same shaft A′ of roller A″, whereby the belt B, working on the rollers A, is moved. The cams revolve in different directions, but are keyed on their shafts in such relation with the clamps and each other that they will close the clamps at the proper time. The clamps may be provided with springs *s*, following the general contour of the cam, bolted to the cam at *s‴*, Figs. 1 and 4, and pass around to the screw *s″* near the point of the cam. A slot, *s′*, in the spring *s*, which incloses the necks of the screws *s″*, allows them a yielding motion to furnish a yielding surface to the profile of the cam, so that, if from any cause, such as knots in the fagots, the clamps do not shut completely, the cams will pass by the rollers *r* without injury, closing the cams as much as may be, thus allowing the machine to continue its work without stoppage. A spring projection, *c*, on the top, or uniting the face of the clamp G′, as shown in Figs. 1 and 4, prevents any of the fagots from rising as the clamps close. An arm, *b*, fixed on the frame C, disengages the spring-catch *a″*, that holds the bottom *d′* of the box shut when the box is immediately over the clamps, allowing the fagots to pass to the clamps when the cams E E′ come in contact with the rollers *r r*, close the clamps G′ G′, and hold the wood firmly therein. A spool, N, Figs. 1 and 3, contains the binding-wire *n*, which is drawn off from the spool by the rollers *h h*, between which it passes, and is conducted on through the hollow shaft *p* of the bevel-pinions X and O; thence it passes on between the edge of a cutter, *f*, and a notched plate, *l*, for receiving the points of the said cutter, and enters a slot, *m′*, in a vertical spindle, *m*, Figs. 1 and 3, after which the wire continues along over a lifter, *n′*, working in the groove of the clamp G′, into the groove in the clamps, and around the exterior of the body of fagots, as shown at Fig. 4, when it emerges from the groove, and passes again through the slot *m′*. The cutter *f* then severs the wire, after which the bevel-wheel O′, to which the spindle *m* is fixed, revolves and twists the ends of the wire, thus locking its ends securely, as shown at Fig. 6.

The wheels connecting with and actuating the rollers which move the wire, the cutter, and twisting-spindle will be hereinafter described.

The groove in the clamps, with the wire lying therein, is shown in detail section at Fig. 4, where also is shown the lifter *n′* pivoted in the clamp G′, and having a bent arm, *n″*, (see corresponding part of Fig. 1,) where the lever *n⁗* is shown pivoted to a lug, *g‴*, attached to the frame C. A pin, *b′*, standing out horizontally from the side of the cam E, strikes against the lever *n⁗*. As the cam revolves, it raises the lifter *n′*, elevating with it the wire *n*, which, just prior to this, moves on and is cut off, so that the two ends of the wire are brought together for twisting. Small projecting points, standing out from the inner faces of the groove in the clamps, prevent the wire from springing, so that its passing end will not catch against the fagots. Their number may be increased, as found desirable. These points are located at *b″*, Fig. 1, and are shown attached to the clamp G′ *b″* at Fig. 8, that point being found, by experiment, the place where they are needed. A nut and spring, N″, Figs. 1 and 3, on the spool N, enables the latter to be adjusted with reference to its friction in order that the wire may be drawn off with greater or less facility, as circumstances may require. The spindle *m* enters an opening, *m″*, in the clamp G′. A half-wheel, S, (shown dotted in Fig. 1,) is keyed on the shaft F′, and its teeth engage a pinion, T, Fig. 3, on a shaft, *t′*, held in bearings *t*. At the end of the shaft *t′* is the roller *h*, which, in connection with a similar one immediately below it, draws the wire from the spool and pushes it on through the hollow shaft *p* and the grooves in the clamps, as before described, and a small pinion, *t″*, engaging with a similar one attached to the lower roller *h*, gives the latter motion. A quarter-wheel, H″ H″, (shown in Fig. 1,) keyed on the shaft F′, engages a pinion, W, on the end of shaft *w*, having bearings W′ W′, Fig. 3, which pinion W gears into the bevel-pinion X on the aforesaid hollow shaft *p*. This pinion has a hole to correspond with the bore of the said shaft, or is set on the end of the shaft, as shown in Fig. 1ª. At the opposite end of this shaft *p* is another bevel-pinion, O, engaging with a similar one, O′, (see Fig. 1,) to which latter is attached the vertical twisting-spindle *m*, before described; and when W is revolved the spindle *m* is simultaneously turned by the revolution of the intervening bevel-gears. The half-wheel S and the quarter-wheel H″, when set on the shaft in the position shown in Fig. 1, and in their relation with the other parts, will engage with their respective pinions T and W, and cause the timely revolution of the latter to draw and push the wire, and lock the same when cut off, in the manner before described. The cutter *f* is pivoted to a lever, *f′*, at *f‴*, the said lever being pivoted to the frame at *f″*. An arm, G, the dotted outline of which is shown in Fig. 1, is keyed on the shaft F, and, when revolving, strikes against the oblique edge of the lever *f′*, and causes the latter to thrust the cutting-point of the cutter *f* against the wire *n* passing over the notched plate *l*, thereby severing it. On each side of the clamps are guide-plates *i* and *i″*, Fig. 2, at a distance apart corresponding with the length of the fagots, and they guide the fagots properly to the clamps, so that their ends shall be even when clamped and bound. The plate *i″* is provided with a circular door, *i‴*, hinged to the plate at *v*. The plate *i* has a circular disk, *i′*, not hinged, but supported centrally by an arm, V‴, bolted to an upright, V″, forming part of a horizontal bar, V, supporting the whole. This bar has a longitudinal motion in guides B′ B′, forming part of the plate B″, by which the guides are secured to the frame C. The disk $i'$ is thus provided with a horizontal motion, and by this motion the bundles of fagots are thrust out of the clamps, when the wire is locked and the clamps relaxed, as before mentioned. The door $i'''$ is provided with a spring at its hinge $v$, exerting its tension to keep the door vertical, but sufficiently yielding to permit the door to turn and allow the bundle of fagots to be thrust out by the disk $i'$. The apron Z delivers the wood out of the machine. This plunger or disk $i'$ is operated by means of an arm, R, on the shaft F, which, in revolving, strikes against a lever, V′, pivoted at $m'''$ to an upright, $m''''$, standing on and forming part of a projection, $m'''''$, Figs. 1 and 3. A vertical spring, $q$, returns the lever V′, and consequently the disk $i'$, to their usual positions, after the arm R has passed. The plates $i$ and $i''$ are bolted to the frame-bottom C′ by bolts $v'$, as shown at Fig. 2.

When the boxes pass over the clamps, after having discharged the fagots therein, the bottoms $d'$ are thrown up and spring into the catch $a''$, before described, as each one passes over the roller A″. If, as is sometimes the case, they do not catch, then a broad spring, M‴, consisting of a bent metallic sheet having a vertical part, is bolted to the frame C, as shown, presenting a surface immediately underneath the chute, and which comes in contact with the box-bottom $d'$, and closes it. The end which thus comes in contact with the bottom $d'$ is over the roller, as shown in the drawing, and closes the bottom before the box comes in position under the chute. The boxes are attached to the belt by clasps at middle points between the ends of the boxes, so that they can pass over the rollers without straining the belt, as shown at D′, Fig. 1ª.

The advantages of this machine consist in the rapidity with which it performs the work, thus dispensing with the great number of persons required heretofore for bundling and tying fagots of kindling-wood for market. The cost of the wire is estimated to be less than the hemp strings now used. The fagot-receptacles are adapted to hold a quantity of wood sufficient for a bundle.

I claim as new, and desire to secure by Letters Patent—

1. In a wood-bundling machine, an endless belt-feed, carrying fagot-receptacles to gage the quantity of and deliver the wood to the compressors, substantially as specified.

2. The clamping-jaws herein described, provided with a groove or passage for the wire, substantially as set forth.

3. Clamping-jaws, herein described, provided with a wire guideway, and combined with rollers for feeding such wire to the jaws, substantially as described.

4. The combination, with the wire-feeding mechanism, of a wire-cutting mechanism and a wire-twisting mechanism, substantially such as described, to move the wire around the fagots, and then cut the wire and twist the ends of the wire together, as set forth.

5. The combination, with the clamping-jaws, of the lifter to raise the end of the severed wire to the end of the twisting-spindle, as and for the purpose described.

6. The combination, with the clamping-jaws, of guide-plates arranged in a plane parallel to the plane in which the jaws move, and adapted to the length of the wood to be bundled, to even the ends of the fagots as they pass to the jaws, as set forth.

7. The combination, with the clamping-jaws, of the projection to prevent the fagots from rising as the jaws close, as set forth.

8. The reciprocating plunger arranged at one side of, and combined with, the bundle forming and fastening mechanism, and with a chute at the opposite side of such mechanism, the plunger operating to remove the completed bundle from the compressing device into the chute, substantially as described.

9. The wood-compressing clamp, provided with wire-guiding grooves, combined with operating-cams, substantially as described.

10. The cam provided with a yielding spring of corresponding shape, as and for the purpose set forth.

11. The guide $e$, having the angular slot $e'$, in combination with the chute E‴, sliding bottoms $e''$ and $e'''$, angular slotted plate $j$, and spring $o$, substantially as described, and for the purpose specified.

12. Segmental gear-wheel S, shaft $t'$, provided with pinion D, rollers $h$ $h$, and hollow shaft $p$, in combination with the slotted spindle $m$ and wire-cutter $f$, substantially as described.

Witnesses: FREDERICK MYERS.
W. H. VAN RENSSELAER,
R. A. VAN RENSSELAER.